May 21, 1968     J. L. NIELSEN ET AL     3,383,941
CABLE INTERCONNECTING MECHANISM FOR CONVERSION ADAPTOR
Filed Jan. 25, 1967
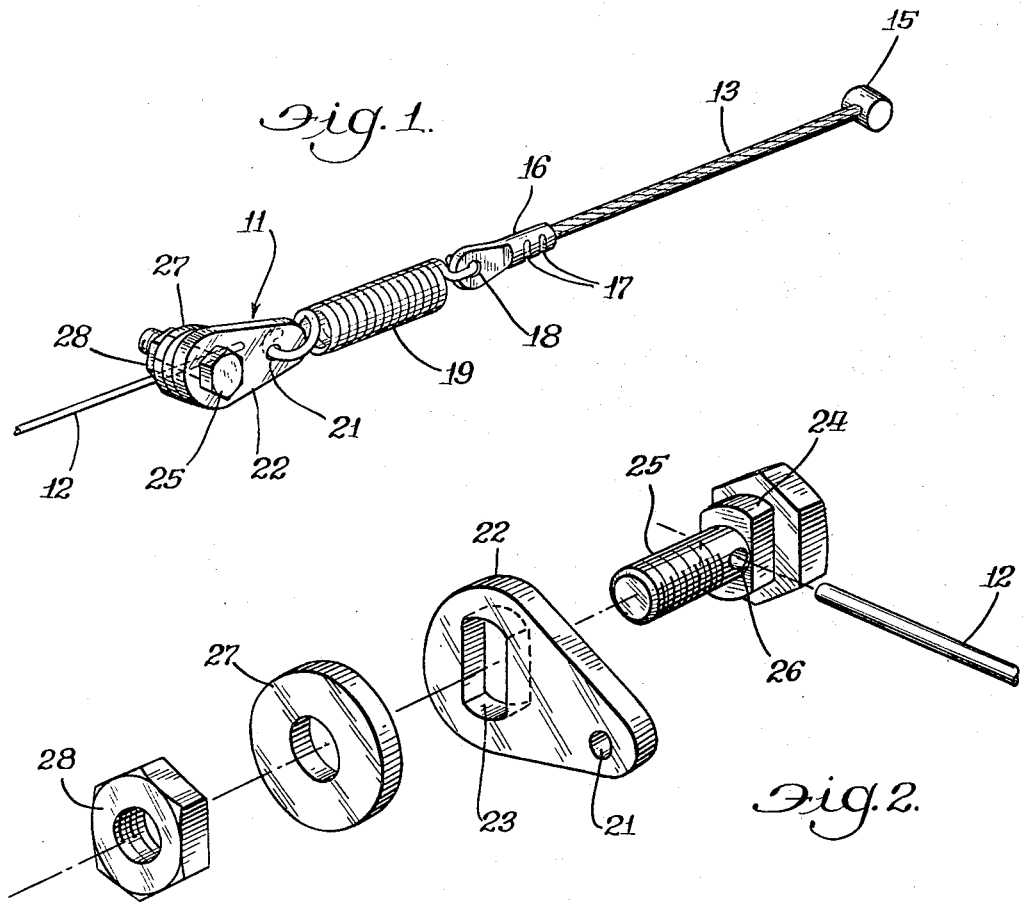
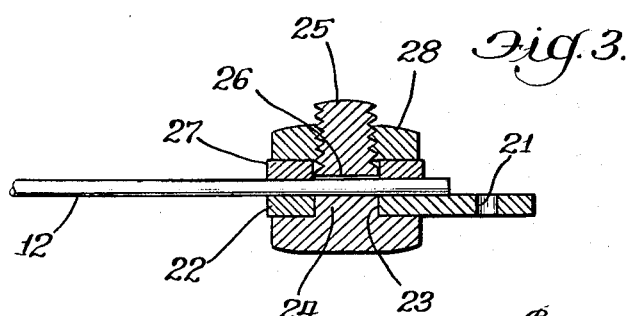
Inventors:
Jorgen L. Nielsen
Frank P. Brilando
Rudolph J. Blaho
By: Horton, Davis, Brewer & Brugman
Attys.

United States Patent Office 3,383,941
Patented May 21, 1968

3,383,941
CABLE INTERCONNECTING MECHANISM FOR
CONVERSION ADAPTOR
Jorgen L. Nielsen, Wilmette, Frank P. Brilando, Niles, and Rudolph G. Blaho, Franklin Park, Ill., assignors to Schwinn Bicycle Company, Chicago, Ill., a corporation of Illinois
Filed Jan. 25, 1967, Ser. No. 611,652
5 Claims. (Cl. 74—501)

ABSTRACT OF THE DISCLOSURE

Conversion adaptor for interconnecting an existing control cable on a bicycle to a new style of manually operable control member.

Background of the invention

The invention relates generally to bicycles and more particularly to the connection of a new style of manually operable control member to a previously installed cable for adjusting a gear shifting or drive transmitting mechanism.

Description of the prior art

It has been customary to mount the manually operable control member, such as that disclosed in U.S. Letters Patent No. 2,902,882 issued Sept. 8, 1959 to Frank A. Schwinn for a multi-speed transmission for a bicycle, on the frame of the bicycle. A new style of stick shift control member, as disclosed in the co-pending application of Frank P. Brilando and Rudolf G. Blaho, Ser. No. 581,619, filed Sept. 23, 1966, having advantages therein described has become very popular, both as an item on new equipment and as a replacement for the older manually operable control members already in use.

Summary of the invention

A principal object is to facilitate substitution of a new style of manually operable control member for one already in use while retaining the existing control cable, thus obviating the necessity of employing a new control cable, rendering the desired change-over simple and holding the cost thereof to a minimum. To this end, a cable attaching mechanism is provided as a conversion adaptor for interconnecting an existing control cable to a new manually operable control member, which adaptor includes an auxiliary piece of cable with connecting means in the form of an anchoring or terminal stud at one end for attachment to the new control member and means for so interconnecting the auxiliary cable to the existing cable as to insure the two cables being maintained substantially in axial alignment with each other. This is effected by a bolt having a head with an inner portion which is non-circular in cross section to matingly engage in a non-circular aperture in a connector plate secured to the auxiliary cable, with the bolt having an aperture extending therethrough perpendicular to its axis and aligned with the point of attachment of the auxiliary cable with the connector plate to receive the existing cable, and nut means mounted on the bolt for clampingly securing the existing cable thereto. With such an arrangement, clamping forces exerted against the existing cable by the clamping or nut means will not be transmitted as turning forces tending to displace the cables from their substantially axial alignment.

At the same time, the interconnecting means may include a spring interposed between the connector plate and the auxiliary cable to prevent overloading of the main cable or the mechanism controlled thereby in response to excessive forces applied to the control member. This is particularly important because the new style control member referred to comprises a relatively long lever and is subjected to youthful exuberant operation.

In the drawings:
FIGURE 1 is a perspective view of a cable interconnecting mechanism embodying the features of the invention;
FIG. 2 is an exploded view of parts of the mechanism on an enlarged scale; and
FIG. 3 is a sectional view of the parts of FIG. 2 in assembled cable clamping position.

Description of the preferred embodiment

Referring more particularly to FIG. 1, reference numeral 11 designates in general a conversion adaptor embodying the features of the invention which is particularly adapted to facilitate substitution of one manually operable control member, such as that designated by reference numeral 14 in the pending application Ser. No. 581,619 previously identified, for another control member mounted on a bicycle and connected to an existing cable 12, such as that identified by reference numeral 10 in U.S. Patent No. 2,902,882 wherein the control cable also is designated by reference numeral 12. The conversion adaptor 11 comprises an auxiliary piece of cable 13, preferably stranded wire, having connecting means in the form of an anchoring or terminal stud 15 secured in any suitable manner to one end for ready attachment to the new control member, like the corresponding stud 58 in said application Ser. No. 581,619, and a sleeve member 16 mounted on the other end and suitably secured thereto, as by crimping as shown at 17. The outer end of sleeve 16 preferably is flattened and provided with a substantially centrally disposed transverse aperture 18 for receiving the usual loop at one end of a coil spring 19.

The loop at the other end of the coil spring 19 engages in an aperture 21 extending through an end portion of a connector plate 22 and centered on the longitudinal center line thereof. Also centered on that center line and extending through the other end portion of the connector plate 22 is a second aperture 23 which is non-circular and matingly receives the inner portion 24 of the head of a bolt 25 which inner head portion is correspondingly non-circular in cross section and preferably of a width axially of the bolt substantially equal to the thickness of connector plate 22.

Adjacent the inner end of the non-circular head portion 24 (FIG. 2), the bolt 25 is provided with an aperture 26 extending therethrough which is perpendicular to its axis and longitudinally aligned with the common center line of the apertures 21 and 23 when the connector plate 22 is mounted on the non-circular head portion 24. As best seen in FIG. 3, this aperture 26 is dimensioned to slidably receive an end portion of the existing cable 12 when the previously mounted control member has been removed and the cable has been cut to eliminate any end anchoring means, such as the sleeve 37 shown in No. 2,902,882. Means for clampingly securing the end of the existing cable 12 to the bolt 25 in such position are provided in the form of a flat washer 27 slidable on the bolt, and a nut 28 for forcing the washer into engagement with those portions of the existing cable 12 adjacent the ends of the bolt aperture 26.

It thus will be seen that the conversion adaptor 11 insures maintaining of the two cables 12 and 13 substantially in axial alignment with each other, and that the clamping forces exerted thereby against the existing cable 12 will not be transmitted to the connector plate 22 as turning forces tending to displace the cables from such alignment. And while the spring 25 prevents overloading of the main or existing cable 12 or the mechanism controlled thereby in response to excessive forces applied to the auxiliary cable 13, it will be appreciated that if this feature were not desired, the spring could be dispensed with and the auxiliary cable 13 connected directly to the connector plate 22 by placing the flat portion of the sleeve member 16 against the inner surface of the connector plate (upper surface of 22 in FIG. 3) and securing the members 16 and 22 together through the agency of their apertures 18 and 21. This would still result in assuring the desired axial alignment of the two cables 12 and 13.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. A conversion adaptor for interconnecting an existing control cable on a bicycle to a manually operable control member, comprising an auxiliary cable having means at one end for attachment to the control member, a connector plate attached to the other end of said auxiliary cable and having a non-circular aperture therein, a bolt having an aperture therethrough perpendicular to its axis for receiving said existing cable and aligned with the point of attachment of said connector plate to said auxiliary cable and a head with an inner portion which is non-circular in cross section to matingly engage in said aperture in said connector plate, and means mounted on said bolt for clampingly securing said existing cable thereto.

2. A conversion adaptor according to claim 1, wherein said aperture through said bolt is disposed adjacent the inner end of said non-circular portion of said bolt head, and said clamping means comprises a washer slidable on said bolt and a nut threadedly mounted on said bolt for forcing said washer into clamping engagement with said existing cable when the same is disposed in said bolt aperture.

3. In a conversion adaptor according to claim 1, spring means for connecting said auxiliary cable to said connector plate to prevent overloading of said existing cable in response to excessive forces applied to said control member.

4. A conversion adaptor according to claim 3, wherein said connector plate has a second aperture therethrough at a point aligned with the axis of that portion of the existing cable disposed in said bolt aperture, and said spring means comprises a coil spring with one end engaged in said second aperture.

5. In a conversion adaptor according to claim 4, a sleeve member secured to said other end of said auxiliary cable and having a transverse aperture for receiving the other end of said coil spring, whereby said cables are maintained substantially in axial alignment with each other.

References Cited

UNITED STATES PATENTS

| | | | |
|---|---|---|---|
| 865,805 | 9/1907 | Sangster | 74—489 |
| 1,461,544 | 7/1923 | Post | 74—502 X |
| 1,472,786 | 11/1923 | Berggren | 74—502 |
| 1,503,918 | 8/1924 | Ruby | 74—502 X |
| 2,902,882 | 9/1959 | Schwinn | 74—533 |
| 3,081,507 | 3/1963 | Gribble | 24—125 |

FOREIGN PATENTS

| | | |
|---|---|---|
| 31,513 | 12/1926 | France. |
| | | (Addition to No. 533,214) |
| 1,065,156 | 12/1953 | France. |

FRED C. MATTERN, JR., *Primary Examiner.*

C. F. GREEN, *Assistant Examiner.*